(No Model.)

M. MARCIL.
GAGE FOR STRAW BRAID SEWING MACHINES.

No. 331,207. Patented Nov. 24, 1885.

Witnesses:
J. A. Rennie
F. L. Emery

Inventor
Michel Marcil,
Per,
Crosby & Gregory
his Attys.

UNITED STATES PATENT OFFICE.

MICHEL MARCIL, OF AMHERST, MASSACHUSETTS, ASSIGNOR TO THE HILLS COMPANY, OF SAME PLACE.

GAGE FOR STRAW-BRAID-SEWING MACHINES.

SPECIFICATION forming part of Letters Patent No. 331,207, dated November 24, 1885.

Application filed July 11, 1885. Serial No. 171,318. (No model.)

*To all whom it may concern:*

Be it known that I, MICHEL MARCIL, of Amherst, county of Hampshire, and State of Massachusetts, have invented an Improvement in Gages for Straw-Braid-Sewing Machines, of which the following description, in connection with the accompanying drawings, is a specification, like letters on the drawings representing like parts.

This invention has for its object to improve the construction of gages used in sewing-machines, and especially sewing-machines for stitching straw braid.

In accordance with my invention the shank of the gage is made tapering upon two of its edges, and is embraced between two flanges, which move the gage by friction.

Figure 1:
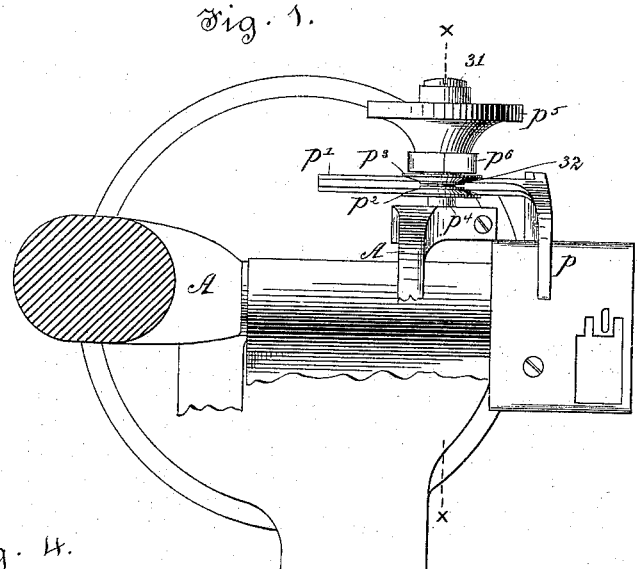
Figure 4:
Figure 2:
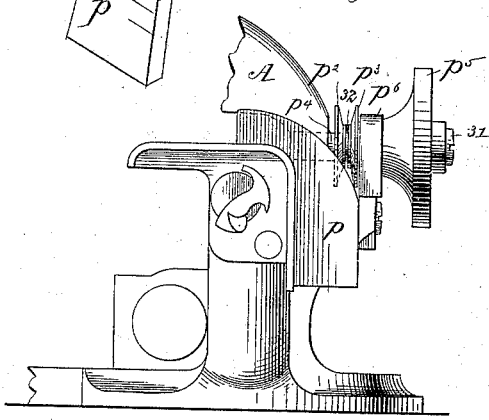
Figure 3:
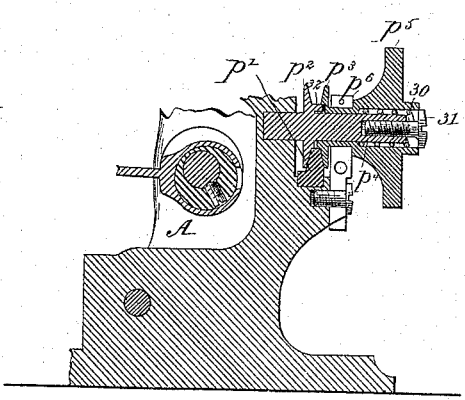

Figure 1 is a top or plan view of a portion of a sewing-machine with my improved gage applied thereto. Fig. 2 is a front or edge view of the same. Fig. 3 is a transverse section taken on the line $x$ $x$, Fig. 1, and Fig. 4 in perspective shows the gage alone.

In the drawings, A designates a part of the frame-work of a sewing-machine such as represented in my application Serial No. 143,133, to which reference may be had. $p$ represents the gage, which has its shank $p'$ made preferably $\wedge$-shaped to enter between two beveled friction-plates, $p^2$ $p^3$. The friction plate or disk $p^2$ is fast upon a loosely-held pin or stud, $p^4$; but the friction plate or disk $p^3$ is connected with the shank of a tubular nut, $p^5$, having a loose bearing in a block, $p^6$. The tubular nut is chambered for the reception of a spring, 30, which is placed therein, and about the stud $p^4$ a screw, 31, being screwed into the end of the said stud, as shown in Fig. 3. The screw 31, by its action on the spring 30, compresses the same, and causes the nut, the shank of which is free to slide to a limited extent in the bearing $p^6$, to be pushed, together with the plate $p^3$, against the shank $p'$ of the gage with more or less force. The two plates $p^2$ $p^3$ are loosely connected by a pin, 32, (see Fig. 3,) so that the plate $p^2$ may be turned in unison with the plate $p^3$. The rotation of the said nut and pulley, the latter engaging the shank $p'$ frictionally, will move the gage in one direction or the other for the required distance.

I do not claim a gage moved by a rack and pinion.

The frictional plates or disks to move the gage reduce the cost of the gage, and enable it to be adjusted and held more securely in place.

I claim—

1. The edge-gage $p$, provided with the beveled extension $p'$, and the friction-plates $p^2$ $p^3$ and stud $p^4$, combined and arranged to embrace the said extension, substantially as described.

2. The bed-plate, the edge-gage, and its beveled extension, combined with the stud $p^4$, friction-plates $p^2$ $p^3$, nut $p^5$, and spring 30, whereby a constant pressure is maintained on the extension $p'$, as and for the purposes set forth.

In testimony whereof I have signed my name to this specification in the presence of two subscribing witnesses.

MICHEL MARCIL.

Witnesses:
 WM. A. DICKINSON,
 LEONARD M. HILLS.